(12) United States Patent
Kim et al.

(10) Patent No.: US 8,998,349 B2
(45) Date of Patent: Apr. 7, 2015

(54) ELECTRONIC CONTROL BRAKE SYSTEM FOR VEHICLES

(71) Applicant: Mando Corporation, Pyeongtaek-si (KR)

(72) Inventors: Hee Jun Kim, Seoul (KR); I Jin Yang, Seoul (KR)

(73) Assignee: Mando Corporation, Pyeongtaek-Si (KR)

( * ) Notice: Subject to any disclaimer, the term of this patent is extended or adjusted under 35 U.S.C. 154(b) by 47 days.

(21) Appl. No.: 13/791,457

(22) Filed: Mar. 8, 2013

(65) Prior Publication Data
US 2013/0264152 A1    Oct. 10, 2013

(30) Foreign Application Priority Data

Mar. 8, 2012   (KR) .................. 10-2012-0023692

(51) Int. Cl.
| | |
|---|---|
| *B60T 13/00* | (2006.01) |
| *B60T 13/14* | (2006.01) |
| *B60T 13/66* | (2006.01) |
| *B60T 1/06* | (2006.01) |
| *B60T 13/68* | (2006.01) |
| *B60T 8/34* | (2006.01) |
| *B60T 8/48* | (2006.01) |
| *B60T 8/50* | (2006.01) |

(52) U.S. Cl.
CPC ............. *B60T 13/142* (2013.01); *B60T 13/147* (2013.01); *B60T 13/662* (2013.01); *B60T 1/065* (2013.01); *B60T 13/686* (2013.01); *B60T 8/348* (2013.01); *B60T 8/4872* (2013.01); *B60T 8/5081* (2013.01)

(58) Field of Classification Search
USPC ............... 303/20, 113.1, 113.2, 116.1, 116.2, 303/119.1, DIG. 11
See application file for complete search history.

(56) References Cited

U.S. PATENT DOCUMENTS

| | | | | |
|---|---|---|---|---|
| 5,288,142 | A * | 2/1994 | Burgdorf | 303/113.2 |
| 5,484,194 | A * | 1/1996 | Reinartz et al. | 303/116.2 |
| 5,927,828 | A * | 7/1999 | Beck | 303/116.2 |
| 6,752,473 | B2 * | 6/2004 | Yang | 303/116.2 |
| 7,896,448 | B2 * | 3/2011 | Bareiss | 303/191 |
| 2003/0146658 | A1 * | 8/2003 | Yang | 303/116.2 |

FOREIGN PATENT DOCUMENTS

| | | |
|---|---|---|
| KR | 10-1997-0021826 | 5/1997 |
| KR | 10-1998-0061234 | 10/1998 |
| KR | 10-2007-0060467 | 6/2007 |
| KR | 10-2011-0021580 | 3/2011 |

OTHER PUBLICATIONS

Office action dated Jul. 16, 2013 from corresponding Korean Patent Application No. 10-2012-0023692 and the English translation by Google Translate.

* cited by examiner

*Primary Examiner* — Pamela Rodriguez
(74) *Attorney, Agent, or Firm* — Ladas & Parry, LLP

(57) ABSTRACT

Disclosed are electronic control brake systems for vehicles which suppress residual frictional force generated due to contact between pads and a disc.

9 Claims, 2 Drawing Sheets

ELECTRONIC CONTROL BRAKE SYSTEM FOR VEHICLES

CROSS-REFERENCE TO RELATED APPLICATION

This application claims the benefit of Korean Patent Application No. 2012-0023692, filed on Mar. 8, 2012 in the Korean Intellectual Property Office, the disclosure of which is incorporated herein in its entirety.

BACKGROUND

1. Field

Embodiments of the present invention relate to an electronic control brake system for vehicles, and more particularly, to an electronic control brake system for vehicles which prevents residual frictional force generated between a disc and pads.

2. Description of the Related Art

In general, a vehicle is provided with a plurality of wheel brakes, each of which includes a caliper device including a disc and a pair of pads to brake a front wheel or a rear wheel to decelerate or stop the vehicle, a booster forming brake hydraulic pressure and transmitting the brake hydraulic pressure to the wheel brakes and a master cylinder, and thus, when a driver presses a brake pedal, the hydraulic pressure formed on the booster and the master cylinder is transmitted to pads of the wheel brakes, and the pads press the disc, thus generating braking force. However, when brake pressure is greater than a road surface state or frictional force of the wheel brakes generated by the brake pressure is greater than braking force generated from tires or a road surface while the driver presses the brake pedal to allow the vehicle to be in a braking force increasing state or a braking force maintaining state, slippage of the tires on the road surface occurs.

Recently, in order to effectively prevent such slippage to provide strong and stable braking force and to facilitate driving operation, brake systems, such as an anti-lock brake system (ABS) preventing slippage of wheels during braking, a traction control system (TCS) preventing excessive slippage of wheels during sudden start or sudden acceleration of a vehicle, and a vehicle dynamic control system stably maintaining the driving state of a vehicle by controlling a brake by combining an ABS and a TCS if the vehicle is not adjusted according to driver intention by force applied from the outside during high-speed driving of the vehicle, have been developed.

These conventional brake systems for vehicles include in common a modulator block (i.e., a hydraulic unit) including a plurality of solenoid valves, accumulators, a motor and pumps to control brake hydraulic pressure transmitted to wheel brakes, and an electronic control unit (ECU) to control electrically operated parts. The ECU senses a vehicle speed through respective wheel sensors disposed on front wheels and rear wheels, and thus controls operation of the respective solenoid valves, motor and pumps.

In the conventional brake systems, a disc of the wheel brake and a pair of pads pressing both sides of the disc may minutely come into contact due to partial abrasion without generation of brake pressure during driving. Contact between the disc and the pads generates residual frictional force and thus causes acceleration and driving loss.

SUMMARY

Therefore, it is an aspect of the present invention to provide an electronic control brake system for vehicles which suppresses residual frictional force generated due to contact between pads and a disc.

Additional aspects of the invention will be set forth in part in the description which follows and, in part, will be obvious from the description, or may be learned by practice of the invention.

In accordance with one aspect of the present invention, an electronic control brake system for vehicles enabling a control of an anti-lock brake system (ABS) mode and a traction control system (TCS) mode includes a master cylinder, wheel brakes, plural NO type solenoid valves and NC type solenoid valves, low pressure accumulators, pumps and a motor, a check valve, an NC type shuttle valve, a TC solenoid valve and electronic control type ON/OFF valves. The master cylinder may form brake hydraulic pressure according to operation of a brake pedal. Each of the wheel brakes may include a caliper device including a disc provided in a vehicle and advancing and retracting a pair of pads pressing the disc so as to exhibit wheel braking force by the brake hydraulic pressure transmitted from the master cylinder. The plural NO type solenoid valves and NC type solenoid valves may be respectively provided at upstream sides and downstream sides of the wheel brakes and control the flow of the brake hydraulic pressure. The low pressure accumulators may allow a fluid discharged from the wheel brakes to be temporarily stored during the ABS mode braking of the solenoid valves. The pumps and the motor may pressurize the fluid stored in the low pressure accumulators so as to discharge the fluid to the wheel brakes or the master cylinder. The check valve may be provided between the low pressure accumulator and the pump. The NC type shuttle valve may be provided on an oil suction path connecting from the master cylinder to an inlet of the pump so as to perform the TCS mode. The TC solenoid valve may be provided between an outlet of the pump and the master cylinder. The electronic control type ON/OFF valves may selectively connect a closed circuit section L1 provided at an oil suction path side to a closed circuit section L2 provided at a wheel brake side.

The closed circuit section L1 may be formed between the check valve and the NC type shuttle valve.

The closed circuit section L2 may be formed by closing the NO type solenoid valves and the NC type solenoid valves.

A fluid in the closed circuit section L1 may be moved toward the outlet side of the pump by operating the pump, and a part of a fluid in the closed circuit section L2 at the wheel brake side may be moved to the closed circuit section L1 by opening the electronic control type ON/OFF valves, thereby retracting the pads from the disc.

The fluid in the closed circuit section L1 may be moved to a section between the pump and the TC solenoid valve.

The fluid in the closed circuit section L1 may return to the master cylinder.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
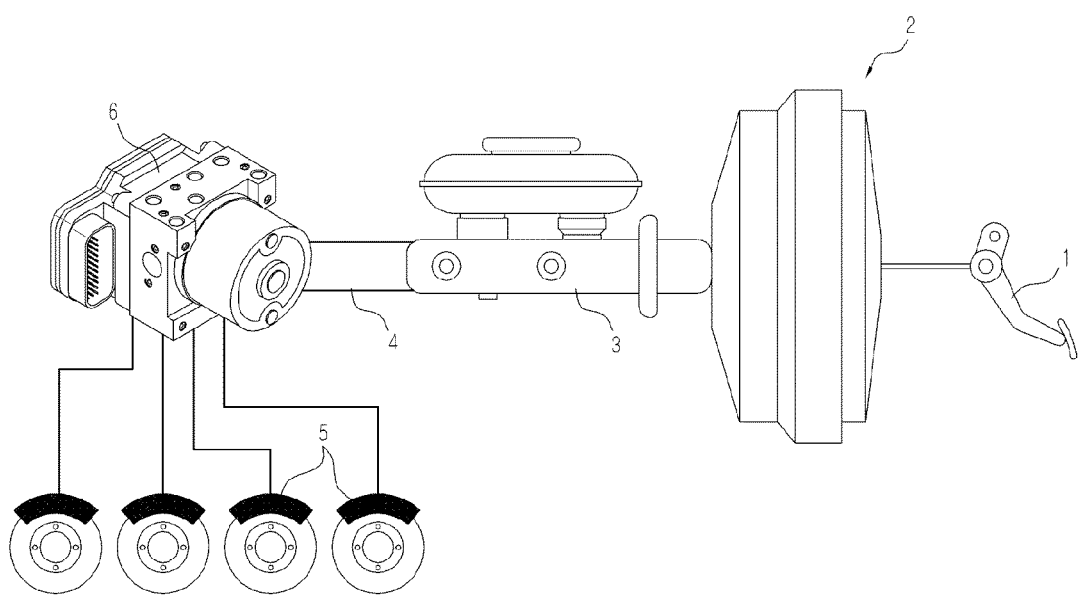
FIG. 1 is a view schematically illustrating an electronic control brake system for vehicles in accordance with one embodiment of the present invention.

Reference will now be made in detail to the embodiments of the present invention, examples of which are illustrated in the accompanying drawings, wherein like reference numerals refer to like elements throughout.

FIG. 1 is a view schematically illustrating an electronic control brake system for vehicles in accordance with one embodiment of the present invention. With reference to FIG. 1, the electronic control brake system for vehicles includes a brake pedal 1, a booster 2 amplifying foot effort on the brake pedal 1 and outputting the amplified foot effort, a master cylinder 3 converting pressure amplified by the booster 2 into hydraulic pressure, and a modulator block 6 connected to the master cylinder 3 by a hydraulic pipe 4 and controlling transmission of brake hydraulic pressure to respective wheel brakes 5. Although not illustrated in detail, the wheel brake 5 includes a caliper device including a disc installed on a wheel, pads located at both sides of the disc, and a piston advancing and retracting a cylinder to press the pads by brake hydraulic pressure.

Figure 2:
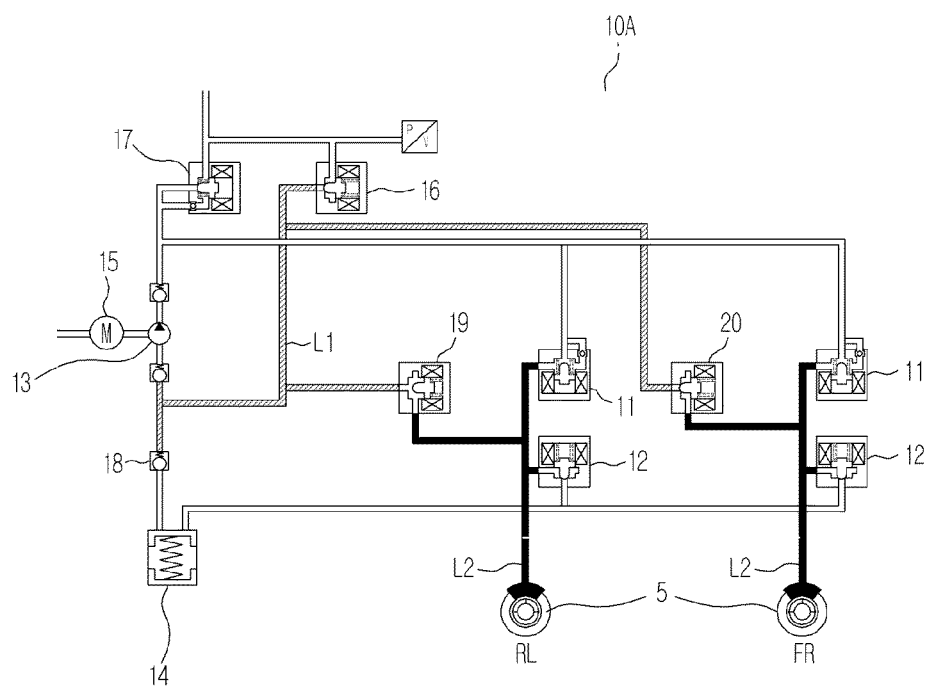
FIG. 2 is a hydraulic circuit diagram of an electronic control brake system for vehicles in accordance with one embodiment of the present invention illustrating a closed circuit section.

FIG. 2 is a hydraulic circuit diagram of a modulator block of an electronic control brake system for vehicles in accordance with this embodiment of the present invention. In this embodiment, an electronic stability control (ESC) enabling a control of an anti-lock brake system (hereinafter, referred to as ABS) and a traction control system (hereinafter, referred to as TCS) will be exemplarily illustrated.

Generally, the master cylinder 3 includes two ports, i.e., a primary port and a secondary port, each of which respectively controls two wheel brakes of four wheel brakes (FR, FL, RR, RL), and each port is provided with a hydraulic circuit. Since the configuration of the secondary hydraulic circuit (not shown) is substantially the same as the configuration of the primary hydraulic circuit 10A, the primary hydraulic circuit 10A will be described hereinafter and a repetitive description of the secondary hydraulic circuit will be omitted. However, a pump 13 provided on the primary hydraulic circuit 10A and a pump (not shown) provided on the second hydraulic circuit 10B are driven together with a phase difference of 180 degrees by one motor 15.

As shown in FIG. 2, the primary hydraulic circuit 10A includes plural solenoid valves 11 and 12 to control brake hydraulic pressure transmitted toward two wheel brakes 5 of a rear left wheel RL and a front right wheel FR, the pump 13 sucking and pumping a fluid (oil) discharged from the wheel brakes 5 or a fluid from the master cylinder 3, a low pressure accumulator 14 temporarily storing the fluid discharged from the wheel brakes 5, and an oil suction path to guide the fluid of the master cylinder 3 such that the fluid is drawn toward an inlet of the pump 13 during a TCS mode.

The plural solenoid valves 11 and 12 are connected to the upstream sides and the downstream sides of the wheel brakes 5. The solenoid valves 11 disposed at the upstream sides of the respective wheel brakes 5 are normal open (NO) type solenoid valves which are maintained in an open state at normal times, and the solenoid valves 12 disposed at the downstream sides of the respective wheel brakes 5 are normal close (NC) type solenoid valves which are maintained in a closed state at normal times. The opening and closing operation of the solenoid valves 11 and 12 is controlled by an electronic control unit (ECU; not shown) sensing a vehicle speed through wheel sensors (not shown) disposed at the respective wheels. For example, during pressure reduction braking, the NO type solenoid valves 11 are closed, the NC type solenoid valves 12 are opened, and thus the fluid discharged from the wheel brake side is temporarily stored in the low pressure accumulator 14.

The pump 13 is driven by the motor 15, sucks and discharges the fluid stored in the low pressure accumulator 14, and thus transmits fluid pressure to the wheel brakes 5 or the master cylinder 3.

In addition, an NC type electric shuttle valve (reference numeral: 16, hereinafter referred to as a NC type shuttle valve: ESV) is installed on an oil suction path, which is configured to guide the fluid of the master cylinder 3 toward an inlet of the pump 13, so as to flow the fluid only toward the inlet of the pump 13. The shuttle valve 16 is closed at normal times, and is open during the TCS mode.

In addition, an NO type solenoid valve (reference numeral: 17, hereinafter referred to as a TC solenoid valve) is installed on a main path connecting the primary port to an outlet of the pump 13 so as to perform a TCS mode control. The TC solenoid valve 17 is maintained in an open state at normal times such that the brake hydraulic pressure formed at the master cylinder 3 is transmitted toward the wheel brake 5 through the main path during a normal brake operation through the brake pedal 1, and also the solenoid valve 17 is closed by the electronic control unit during the TCS mode control. Although not shown, a relief path and a relieve valve are provided between the oil suction path and the main path. The relief path and the relieve valve, during the TCS mode, returns the brake hydraulic pressure, which is discharged from the pump 13, to the master cylinder 3, if the brake hydraulic pressure increases above a desired amount.

Hereinafter, the function and effects of the above-described electronic control brake system for vehicles in accordance with this embodiment will be described.

When slippage occurs during braking of a vehicle provided with such an electronic control brake system, the ECU performs the ABS in three modes, i.e., pressure reducing, pressure raising and pressure maintaining modes, based on signals input from the respective wheel sensors. The respective ABS control modes of the four wheels FR, FL, RR and RL are not controlled identically but, rather, are controlled individually according to road conditions and ABS control states. Now, the respective control modes will be described in stages through the primary hydraulic circuit 10A.

First, in a state in which a driver presses the brake pedal 1 and thus braking force is exhibited by fluid pressure generated by the master cylinder 3, when brake pressure at the wheel brakes 5 connected to the primary hydraulic circuit 10A is greater than a road condition (in the pressure reducing mode), the ECU executes an ABS pressure reducing mode by closing the NO type solenoid valves 11 and opening the NC type solenoid valves 12 so as to reduce the brake pressure to a proper pressure. Then, a part of fluid pressure (the fluid) is discharged from the wheel brake side and is temporarily stored in the low pressure accumulator 14, and the braking force of the wheel brakes 5 mounted on the respective wheels is reduced and slippage of the vehicle on the road is prevented.

When the ABS reducing mode is continued for a long time, vehicle braking efficiency is lowered. Therefore, in order to increase fluid pressure of the wheel brakes 5, the ECU drives the motor 15, and thereby, an ABS raising mode is executed by use of fluid pressure discharged from the pump 13 of the primary hydraulic circuit 10A. That is, the fluid stored in the low pressure accumulator 14 is pressurized by the pump 13, and is transmitted toward the wheel brakes 5 through the opened NO type solenoid valves 11, thereby increasing brake pressure. Here, fluid pressure discharged from the pump of the secondary hydraulic circuit is returned to the master cylinder 3 or is transmitted toward the wheel brakes connected to the secondary hydraulic circuit according to brake pressure conditions.

If the brake pressure reaches a state generating the optimum braking force or the brake pressure needs to be maintained uniformly in order to prevent resonance of the vehicle, the ECU executes the ABS pressure maintaining mode. The ABS pressure maintaining mode eliminates fluctuation of pressure in the wheel brakes 5, and movement of hydraulic pressure is prevented by closing the NO type solenoid valves 11 of the primary hydraulic circuit 10A. Here, fluid pressure discharged from the pump 13 is transmitted toward the master cylinder 3, and thus the ABS pressure maintaining mode is stably executed.

Meanwhile, the above-described TCS is performed when the ECU senses slippage, generated when a driver presses an acceleration pedal (not shown) deeply and thus the vehicle suddenly starts to drive on a slippery road, through wheel sensors. Then, during the TCS mode, the ECU opens the NC type shuttle valve 16 on the oil suction path, closes the TC solenoid valve 17 on the main path, and drives the motor 15 and the pump 13 to pump the fluid.

That is, when the TCS mode is executed, the fluid of the master cylinder 3 side is sucked to the inlet of the pump 13 through the oil suction path, and the fluid discharged to the outlet of the pump 13 is transmitted to the wheel brakes 5 through the main path and the opened NO type solenoid valves 11 and acts as brake pressure. Consequently, when the driver presses the acceleration pedal for sudden start, designated lock is applied to the wheels even if the driver does not press the brake pedal 1, and thus the vehicle slowly and stably starts even in slippery conditions, that is, under poor road conditions.

Meanwhile, during a constant speed mode driving such as a cruise, the electronic control unit performs an active brake-pad retraction system (ABRS) mode that adjusts an interval between a disc and pads so as to prevent a residual frictional force from being generated due to the contact between the disc and pads in a non-braking state, thereby enhancing the driving performance. That is, during the ABRS mode, the electronic control unit moves a part of the fluid in the hydraulic circuit at the wheel brake 5 so as to decrease the fluid pressure of the piston pressing the pads such that the pads are retracted from the disc.

To this end, electronic control type ON/OFF valves 19 and 20, i.e., solenoid valves are additionally installed between a section L1 on the oil suction path used during the TCS mode and a section L2 of the hydraulic circuit at the wheel brake side. The electronic control type ON/OFF valves 19 and 20 are provided as an NC type.

In detail, since the NC type shuttle valve 16 on the oil suction path and a check valve 18 provided between the low pressure accumulator 14 and the pump 13 are maintained in the closed state at normal times, the section L1 is formed as a closed circuit without an additional control operation. In addition, as for the hydraulic circuit at the wheel brake side, if the NO type solenoid valve 11 is closed and the NC type solenoid valve 12 is maintained in the closed state, the section L2 between the solenoid valves 11 and 12 is formed as a closed circuit. If the NC type solenoid valve 12 is additionally open, a section between the solenoid valve 12 and the low pressure accumulator 14 is formed as a closed circuit. On the drawing, the shaded line on the upper left side represents the closed circuit section L1 formed at the oil suction path, and the bold line on the lower right side represents the closed circuit section L2.

When the ABRS mode is executed, the ECU closes the NO type solenoid valve 11 at the wheel brake side to form the section L2 between the solenoid valve 12 and the wheel brake 5 as a closed circuit section. In addition, as the pump 13 is driven, the fluid in the closed circuit section L1 on the oil suction path is moved toward the outlet of the pump 13, thus the closed circuit section L1 becomes a negative pressure state.

Thereafter, the electronic control unit opens the NC type electronic control type ON/OF valves 19 and 20 so that the fluid in the closed circuit section L2 at the wheel brake side is drawn toward the pump 13, and thus the fluid volume at the wheel brake side is reduced and the piston is retracted, and as a results, the pads move away from the disc. The pads may be returned to their original positions, i.e., their normal braking positions, by adjusting a displacement amount using a sensor sensing the pressure of the fluid. The fluid discharged to the outlet of the pump 13 may be stored in the hydraulic circuit between the pump 13 and the NO type TC solenoid valve 17 by closing the NO type TC solenoid valve 17, or be returned to the master cylinder 3 by opening the NO type TC solenoid valve 17.

As is apparent from the above description, an electronic control brake system for vehicles, by use of a motor and a pump, moves a fluid in a closed circuit section formed in a hydraulic circuit to the outside of the closed circuit section and moves a part of a fluid in another closed circuit provided at the wheel brake side to the closed circuit section so that the fluid volume is reduced, thereby retracting pads from a disc and effectively preventing residual frictional force generated due to contact between the disc and the pads.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic control brake system for vehicles enabling a control of an anti-lock brake system (ABS) mode and a traction control system (TCS) mode, the electronic control brake system comprising a master cylinder forming brake hydraulic pressure according to operation of a brake pedal, wheel brakes, each of which includes a caliper device including a disc provided in a vehicle and advancing and retracting a pair of pads pressing the disc so as to exhibit wheel braking force by the brake hydraulic pressure transmitted from the master cylinder, plural NO type solenoid valves and NC type solenoid valves respectively provided at upstream sides and downstream sides of the wheel brakes and controlling the flow of the brake hydraulic pressure, a low pressure accumulator in which a fluid discharged from the wheel brakes is temporarily stored during the ABS mode braking of the solenoid valves, a pump and a motor pressurizing the fluid stored in the low pressure accumulator so as to discharge the fluid to the wheel brakes or the master cylinder, a check valve provided between the low pressure accumulator and the pump, an NC type shuttle valve provided on an oil suction path connecting from the master cylinder to an inlet of the pump so as to perform the TCS mode, a TC solenoid valve provided between an outlet of the pump and the master cylinder, and electronic control type ON/OFF valves selectively connecting a closed circuit section provided at an oil suction path side to a closed circuit section provided at a wheel brake side.

2. The electronic control brake system for vehicles according to claim 1, wherein the closed circuit section at the oil suction path side is formed between the check valve and the NC type shuttle valve.

3. The electronic control brake system for vehicles according to claim 2, wherein the closed circuit section at the oil suction path side is formed by closing the NO type solenoid valves and the NC type solenoid valves.

4. The electronic control brake system for vehicles according to claim 3, wherein a fluid in the closed circuit section at the oil suction path side is moved toward the outlet side of the pump by operating the pump and a part of a fluid in the closed circuit section at the wheel brake side is moved to the closed circuit section by opening the electronic control type ON/OFF valves, thereby retracting the pads from the disc.

5. The electronic control brake system for vehicles according to claim 4, wherein the fluid in the closed circuit section at the oil suction path side is moved to a section between the pump and the TC solenoid valve.

6. The electronic control brake system for vehicles according to claim 5, wherein the fluid in the closed circuit section at the oil suction path side returns to the master cylinder.

7. The electronic control brake system for vehicles according to claim 1, wherein a fluid in the closed circuit section at the oil suction path side is moved toward the outlet side of the pump by operating the pump and a part of a fluid in the closed circuit section at the oil suction path side at the wheel brake side is moved to the closed circuit section by opening the electronic control type ON/OFF valves, thereby retracting the pads from the disc.

8. The electronic control brake system for vehicles according to claim 7, wherein the fluid in the closed circuit section at the oil suction path side is moved to a section between the pump and the TC solenoid valve.

9. The electronic control brake system for vehicles according to claim 8, wherein the fluid in the closed circuit section at the oil suction path side returns to the master cylinder.

* * * * *